United States Patent
Chuang

(10) Patent No.: US 9,655,022 B2
(45) Date of Patent: May 16, 2017

(54) METHOD OF CELL RESELECTION

(71) Applicant: ACER INCORPORATED, New Taipei (TW)

(72) Inventor: Ming-Dao Chuang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 25 days.

(21) Appl. No.: 14/753,002

(22) Filed: Jun. 28, 2015

(65) Prior Publication Data

US 2016/0127970 A1    May 5, 2016

Related U.S. Application Data

(60) Provisional application No. 62/072,435, filed on Oct. 30, 2014.

(30) Foreign Application Priority Data

Jan. 27, 2015   (TW) ............... 104102724 A

(51) Int. Cl.
| | | |
|---|---|---|
| H04W 36/00 | (2009.01) | |
| H04W 36/24 | (2009.01) | |
| H04W 4/00 | (2009.01) | |
| H04L 12/26 | (2006.01) | |
| H04W 48/12 | (2009.01) | |
| H04W 8/00 | (2009.01) | |

(52) U.S. Cl.
CPC ............ *H04W 36/24* (2013.01); *H04L 43/16* (2013.01); *H04W 4/005* (2013.01); *H04W 8/005* (2013.01); *H04W 48/12* (2013.01)

(58) Field of Classification Search
CPC ..... H04W 36/24; H04W 8/005; H04W 48/12; H04W 4/005; H04L 43/16
See application file for complete search history.

(56) References Cited

U.S. PATENT DOCUMENTS

2006/0035662 A1   2/2006 Jeong
2007/0223510 A1   9/2007 Joo
(Continued)

FOREIGN PATENT DOCUMENTS

CN   101772118 A   7/2010
CN   102958000 A   3/2013
(Continued)

OTHER PUBLICATIONS

Prioritized reselection of D2D supported frequency, 3GPP TSG-RAN WG2 #86, Seoul, Korea, May 19-23, 2014, pp. 1/3-3/3, R2-142631, XP050818900.

(Continued)

*Primary Examiner* — Ajit Patel
(74) *Attorney, Agent, or Firm* — Winston Hsu; Scott Margo

(57) ABSTRACT

A cell reselection method adapted to a communication device of a communication system includes receiving a first priority information and a Device to Device communication information broadcasted by a network node of the communication system; and rearranging the first priority information into a second priority information according to the D2D communication information when the communication device is in an operation scenario.

12 Claims, 6 Drawing Sheets

(56) References Cited

U.S. PATENT DOCUMENTS

| | | | | |
|---|---|---|---|---|
| 2010/0273485 A1* | 10/2010 | Huang | .................. | H04W 36/34 455/435.3 |
| 2011/0312328 A1 | 12/2011 | Choi | | |
| 2013/0109301 A1 | 5/2013 | Hakola | | |
| 2013/0183963 A1 | 7/2013 | Turtinen | | |
| 2014/0086208 A1 | 3/2014 | Murray | | |
| 2014/0153474 A1* | 6/2014 | Zhao | .................. | H04W 36/0083 370/312 |
| 2014/0274066 A1 | 9/2014 | Fodor | | |
| 2016/0212665 A1* | 7/2016 | Fukuta | .................. | H04W 48/12 |
| 2016/0219566 A1* | 7/2016 | Jung | ..................... | H04W 72/04 |

FOREIGN PATENT DOCUMENTS

| | | |
|---|---|---|
| CN | 102204344 B | 3/2014 |
| CN | 103686898 A | 3/2014 |
| CN | 104105217 A | 10/2014 |
| WO | 2009054702 A1 | 4/2009 |
| WO | 2014158235 A1 | 10/2014 |
| WO | 2015142898 A1 | 9/2015 |
| WO | 2016006560 A1 | 1/2016 |

OTHER PUBLICATIONS

LG Electronics, Support of UE interested in both D2D and MBMS, 3GPP TSG-RAN WG2 #87bis, Shanghai, China, Oct. 6-10, 2014, pp. 1-2, R2-144494, XP050870365.

Acer Incorporated, Cell reselection priority with ProSe communication, 3GPP TSG RAN WG2 #88, Nov. 17-21, 2014, San Francisco, USA, p. 1, R2-144812, XP050895145.

3GPP TS 36.331 V12.3.0 (Sep. 2014).

3GPP TS 36.304 V12.2.0 (Sep. 2014).

3GPP TR 36.843 V12.0.1 (Mar. 2014).

3GPP TSG-RAN WG2 #86, R2-142429, May 19-23, 2014.

SeungJune Yi et al., Radio Protocols for LTE and LTE-Advanced, First Edition, XP055322906, Nov. 30, 2012, pp. 27-45, John Wiley & Sons Singapore Pte. Ltd.

Moray Rumney, LTE and the Evolution to 4G Wireless: Design and Measurement Challenges, Second Edition, XP055322903, Oct. 21, 2016, pp. 91-157, John Wiley & Sons, Ltd.

* cited by examiner

METHOD OF CELL RESELECTION

CROSS REFERENCE TO RELATED APPLICATIONS

This application claims the benefit of U.S. provisional application No. 62/072,435 filed on 2014 Oct. 30, included herein by reference in its entirety.

BACKGROUND OF THE INVENTION

1. Field of the Invention

The present invention is related to a method of cell reselection, and more particularly, to a method of cell reselection with rearranged priorities for cell reselection according to whether D2D communication is supported.

2. Description of the Prior Art

In cellular communication systems, communication devices communicate with each other via abase station, i.e., the base station is an intermediate entity between the communication devices. Such a scenario is inefficient in aspects of coverage area, resource utilization and transmission delay, especially when the communication devices are close to each other and are able to communicate with each other directly. Therefore, device to device (D2D) communication is proposed. In such a situation, two nearby communication devices may communicate (for example, transmitting/receiving packets) with each other directly according to the D2D communication, and the base station does not need to forward the packets transmitted between the communication devices in order to improve a coverage area of the base station, the resource utilization and/or the transmission delay.

According to 3rd Generation Partnership Project (3GPP) standard TS 36.843 section 9.1.2, D2D communication may adopt two modes for resource allocation: Mode 1 and Mode 2. In Mode 1, when two communication devices in coverage of a base station intend to perform D2D communication, the base station is configured to allocate necessary resources to the two communication devices. However, it is not possible to perform D2D communication in Mode 1 when a communication device is out of coverage of the base station. In Mode 2, when two communication devices intend to perform D2D communication, a specific resource is selected from a resource pool to transmit data. Therefore, Mode 2 is feasible even when a communication device is out of coverage or at the edge of coverage of the base station, and a communication device entering idle mode would mainly support Mode 2.

However, a communication device has no idea whether the network node supports D2D communication and whether Mode 2 or Mode 1 of D2D communication is supported. Furthermore, the magnitudes of CellReselectionPriority defined in TS 36.331 is irrelevant to whether the network node supports D2D communication or not; therefore, neighbor cells with highest priority or frequencies with highest priority on the basis of CellReselectionPriority may not support D2D communication. When the communication device performs cell reselection according to CellReselectionPriority broadcasted by the network node, the communication device may reselect to a neighbor cell which does not support D2D communication and is thus forced to terminate the ongoing D2D communication. There is a need for an improved method of cell reselection.

SUMMARY OF THE INVENTION

The present invention therefore provides a method of cell reselection with rearranged priorities for cell reselection according to whether D2D communication is supported.

An embodiment of the present invention discloses a cell reselection method, which is adapted to a communication device of a communication system, and comprises receiving a first priority information and a Device to Device (D2D) communication information broadcasted by a network node of the communication system; and rearranging the first priority information into a second priority information according to the D2D communication information when the communication device is in an operation scenario.

An embodiment of the present invention discloses a cell reselection method, which is adapted to a network node of a communication system, and comprises broadcasting a first priority information and a Device to Device (D2D) communication information; wherein a communication device of the communication system rearranges the first priority information into a second priority information according to the D2D communication information when the communication device is in an operation scenario.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
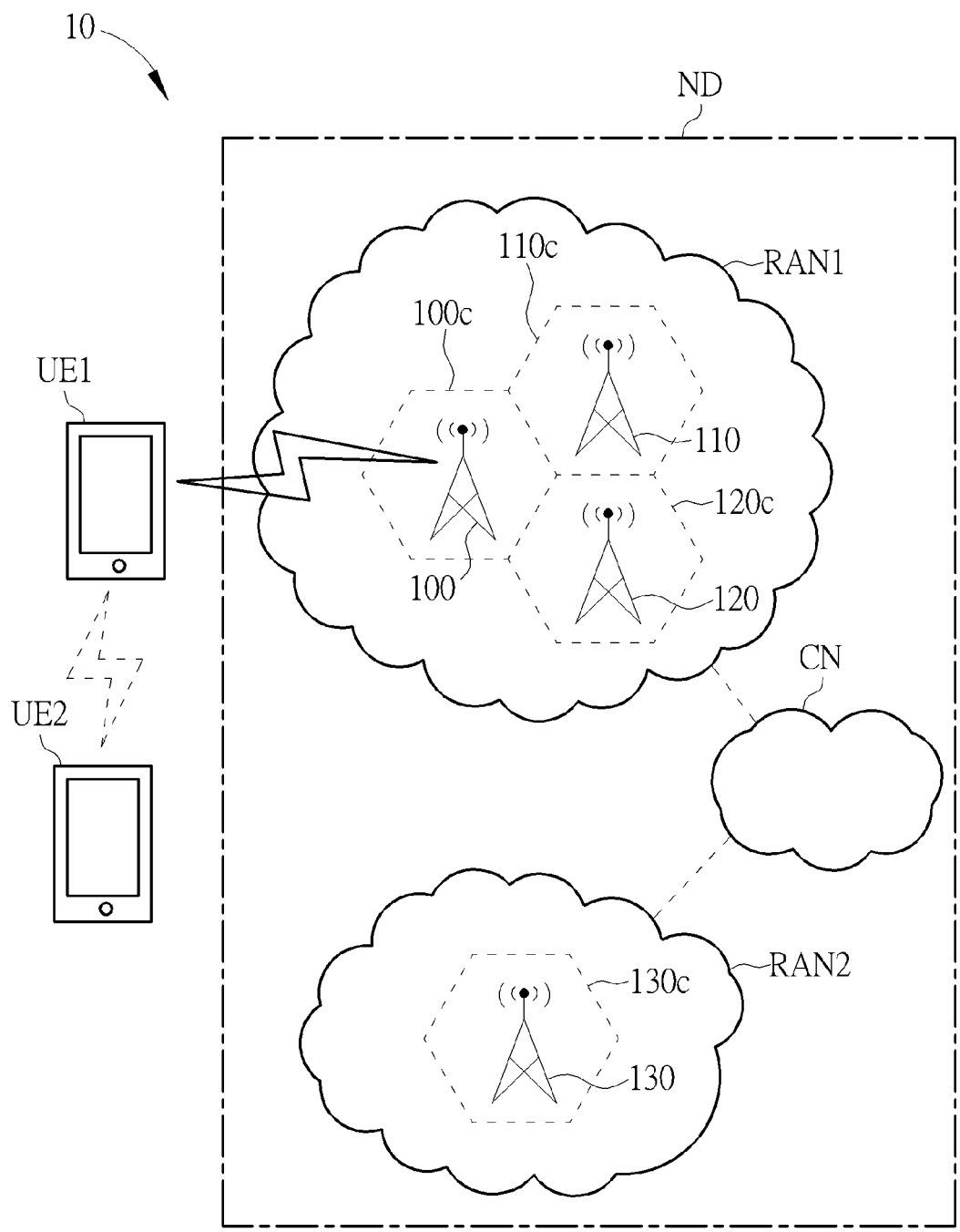
FIG. 1 is a schematic diagram illustrating a communication system according to an example of the present invention.

FIG. 1 is a schematic diagram illustrating a communication system 10 according to an example of the present invention. The communication system 10 is a cellular network wireless communication system, which briefly comprises a network node ND, communication devices UE1 and UE2. It is worth noting that the network node ND and/or the communication devices UE1 and UE2 in FIG. 1 are simply utilized for illustrating the structure of the wireless communication system 10. The network node ND may comprise radio access networks RAN1 and RAN2. The radio access networks RAN1 and RAN2 comprise base stations 100, 110, 120, 130, respectively. The base stations 100 to 130 may serve cells 100c, 110c, 120c, 130c respectively, but not limited thereto. A base station may provide services within a plurality of cells according to different systems. In an embodiment, the radio access networks RAN1 and RAN2 can be a universal terrestrial radio access network (UTRAN) in a universal mobile telecommunications system (UMTS) respectively, and the base stations 100 to 130 correspond to Node-Bs (NBs). In another example, the radio access networks RAN1 and RAN2 can be an evolved UTRAN (E-UTRAN) in a long term evolution (LTE) system, a LTE-Advanced (LTE-A) system or an evolution of the LTE-A system respectively, and the base stations 100 to 130 correspond to evolved NBs (eNBs). In another example, the radio access networks RAN1 and RAN2 may be a radio access network conforming to wireless standards such as IEEE 802.11 and IEEE 802.16 respectively.

Furthermore, the network node ND can also include both the radio access network RAN1, RAN2 and a core network CN, wherein the core network CN includes network entities such as a Mobility Management Entity (MME), a Serving Gateway (S-GW), a Packet Data Network (PDN) Gateway (P-GW), a Self-Organizing Networks (SON) server and/or a Radio Network Controller (RNC). In other words, after the network node ND receives information transmitted by a communication device, the information may be processed only by the radio access networks RAN1, RAN2 and decisions corresponding to the information are made at the radio access networks RAN1, RAN2. Alternatively, the radio access networks RAN1, RAN2 may forward the information to the core network CN, and the decisions corresponding to the information are made at the core network CN after the core network processes the information. Besides, the information can be processed by both the radio access networks RAN1, RAN2 and the core network CN, and the decisions are made after coordination and/or cooperation are performed by the radio access networks RAN1, RAN2 and the core network CN. The communication devices UE1, UE2 can be a user equipment (UE), a machine type communication (MTC) device, a mobile phone, a laptop, a tablet computer, an electronic book or a portable computer system, respectively. Besides, the network node ND and the communication devices UE1, UE2 can be regarded as a transmitter or a receiver according to transmission, for example, for an uplink (UL), the communication devices UE1, UE2 are the transmitter and the network node ND is the receiver, and for a downlink (DL), the network node ND is the transmitter and the communication devices UE1, UE2 are the receiver.

Figure 2:
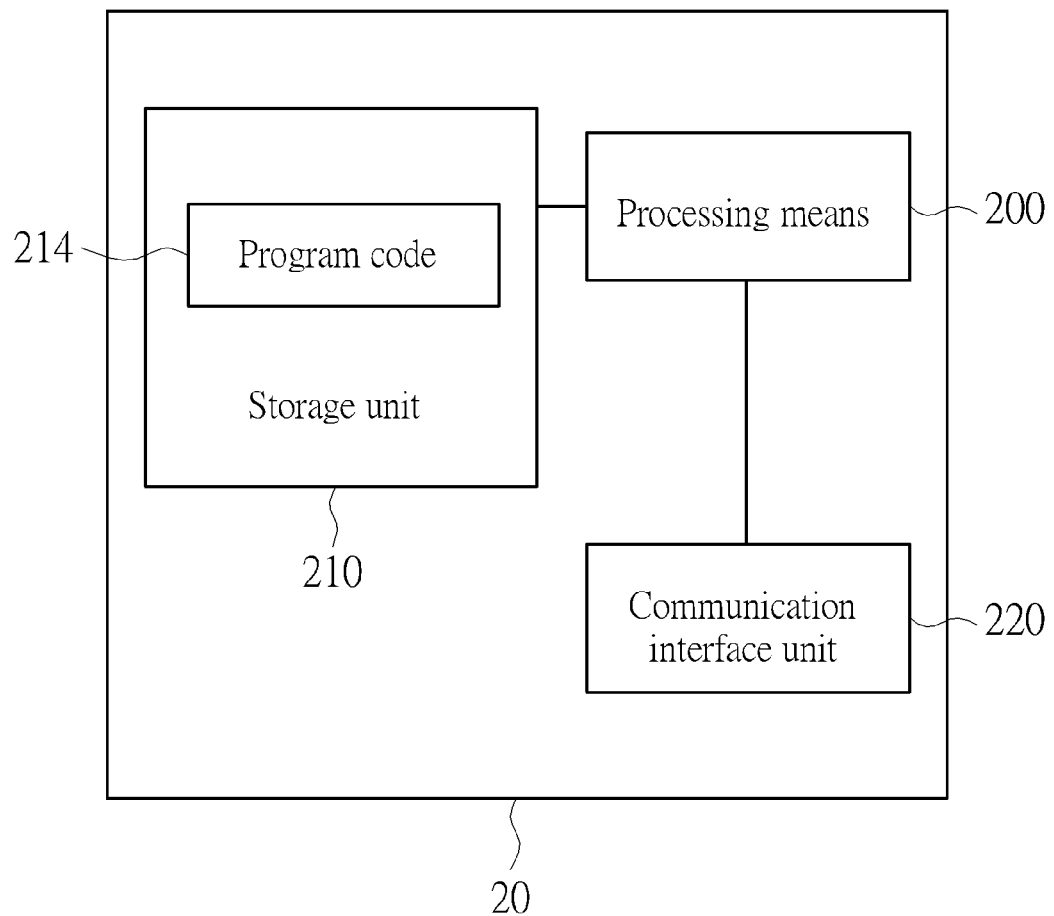
FIG. 2 is a schematic diagram illustrating a device according to an example of the present invention.

FIG. 2 is a schematic diagram illustrating a device 20 according to an example of the present invention. The device 20 can be the communication devices UE1, UE2 or a device implemented in the network node ND shown in FIG. 1, but is not limited herein. The device 20 may include a processing means 200 such as a microprocessor or an Application Specific Integrated Circuit (ASIC), a storage unit 210 and a communication interface unit 220. The storage unit 210 may be any data storage device that can store a program code 214, accessed and executed by the processing means 200. Examples of the storage unit 210 include but are not limited to a subscriber identity module (SIM), a read-only memory (ROM), a flash memory, a random-access memory (RAM), a CD-ROM/DVD-ROM, a magnetic tape, a hard disk and an optical data storage device. The communication interface unit 220 is preferably a transceiver and is used to transmit and receive signals (for example, messages or packets) according to processing results of the processing means 200.

Figure 3:
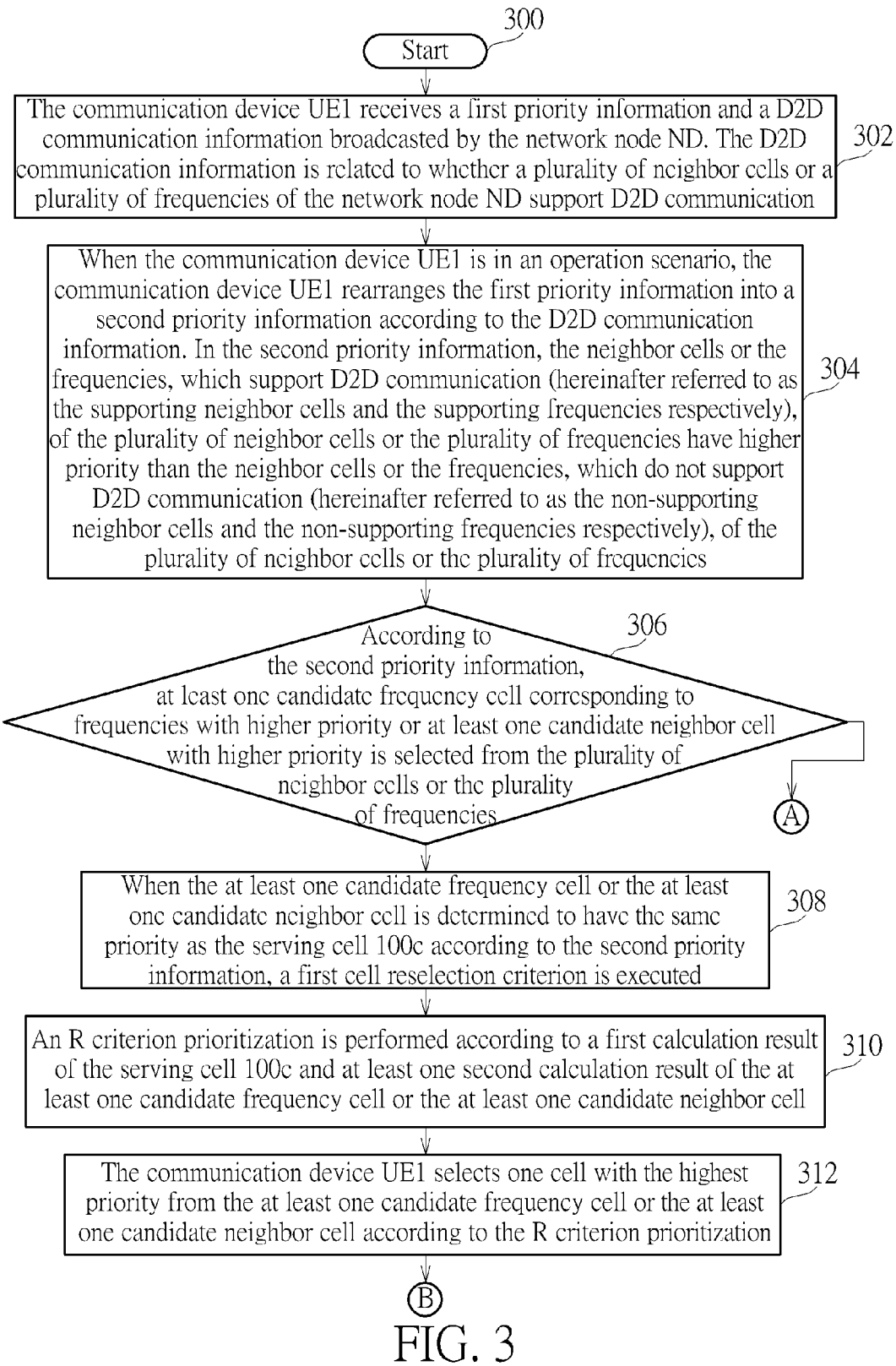
FIG. 3 and FIG. 4 are flowcharts illustrating a process according to an embodiment of the present invention.
Figure 4:
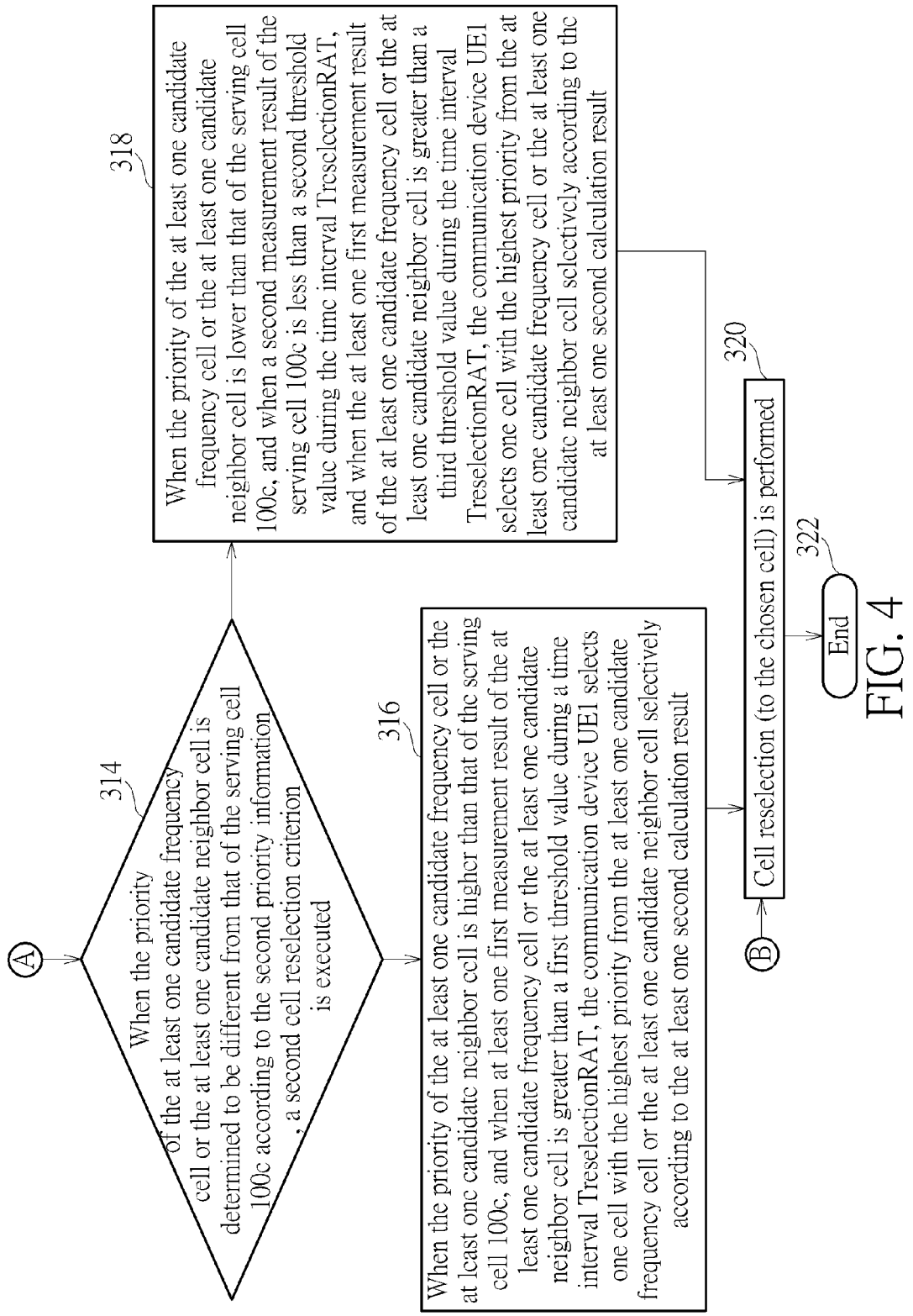

FIG. 3 and FIG. 4 are flowcharts illustrating a process 30 according to an embodiment of the present invention. The process 30 can be utilized in the communication device UE1 shown in FIG. 1 to perform cell reselection. The process 30 may be compiled into the program code 214 and includes the following steps:

Step 300: Start.

Step 302: The communication device UE1 receives a first priority information and a D2D communication information broadcasted by the network node ND. The D2D communication information is related to whether a plurality of neighbor cells or a plurality of frequencies of the network node ND support D2D communication.

Step 304: When the communication device UE1 is in an operation scenario, the communication device UE1 rearranges the first priority information into a second priority information according to the D2D communication information. In the second priority information, the neighbor cells or the frequencies, which support D2D communication (hereinafter referred to as the supporting neighbor cells and the supporting frequencies respectively), of the plurality of neighbor cells or the plurality of frequencies have higher priority than the neighbor cells or the frequencies, which do not support D2D communication (hereinafter referred to as the non-supporting neighbor cells and the non-supporting frequencies respectively), of the plurality of neighbor cells or the plurality of frequencies.

Step 306: According to the second priority information, at least one candidate frequency cell corresponding to frequencies with higher priority or at least one candidate neighbor cell with higher priority is selected from the plurality of neighbor cells or the plurality of frequencies.

Step 308: When the at least one candidate frequency cell or the at least one candidate neighbor cell is determined to have the same priority as the serving cell 100c according to the second priority information, a first cell reselection criterion is executed.

Step 310: An R criterion prioritization is performed according to a first calculation result of the serving cell 100c and at least one second calculation result of the at least one candidate frequency cell or the at least one candidate neighbor cell.

Step 312: The communication device UE1 selects one cell with the highest priority from the at least one candidate frequency cell or the at least one candidate neighbor cell according to the R criterion prioritization. After that, go to Step 320.

Step 314: When the priority of the at least one candidate frequency cell or the at least one candidate neighbor cell is determined to be different from that of the serving cell 100c according to the second priority information, a second cell reselection criterion is executed.

Step 316: When the priority of the at least one candidate frequency cell or the at least one candidate neighbor cell is higher than that of the serving cell 100c, and when at least one first measurement result of the at least one candidate frequency cell or the at least one candidate neighbor cell is greater than a first threshold value during a time interval $T\text{reselection}_{RAT}$, the communication device UE1 selects one cell with the highest priority from the at least one candidate frequency cell or the at least one candidate neighbor cell selectively according to the at least one second calculation result. After that, go to Step 320.

Step 318: When the priority of the at least one candidate frequency cell or the at least one candidate neighbor cell is lower than that of the serving cell 100c, and when a second measurement result of the serving cell 100c is less than a second threshold value during the time interval $T\text{reselection}_{RAT}$, and when the at least one first measurement result of the at least one candidate frequency cell or the at least one candidate neighbor cell is greater than a third threshold value during the time interval $T\text{reselection}_{RAT}$, the communication device UE1 selects one cell with the highest priority from the at least one candidate frequency cell or the at least one candidate neighbor cell selectively according to the at least one second calculation result. After that, go to Step 320.

Step 320: Cell reselection (to the chosen cell) is performed.

Step 322: End.

Specifically, according to Step 302, the communication device UE1 camps on a serving cell (such as the cell 100c), and receives a system information broadcasted by the serving cell 100c. The system information comprising the D2D communication information and the first priority information can be transmitted using a System Information Block type 3 (SIB3), a System Information Block type 5 (SIB5), a System Information Block type 6 (SIB6), a System Information Block type 7 (SIB7), a System Information Block type 8 (SIB8) or a radio resources control (RRC) connection release process. The first priority information is utilized to indicate the priority of the plurality of neighbor cells or the plurality of frequencies of the network node ND in a cell reselection procedure, and comprises first CellReselectionPriority parameters. Each of the first CellReselectionPriority parameters is an integer in a range of 0 to 7 used to indicate the cell reselection priority according to 3GPP standard TS 36.331 (i.e., CellReselectionPriority), wherein value 7 means the highest priority. The plurality of neighbor cells are the cells (such as the cell 110c) having the same (intra) frequency as the serving cell 100c; the plurality of frequencies are the (inter) frequencies (such as the frequency corresponding to the cell 120c), which are different from that of the serving cell 100c, or the frequencies (such as the frequency corresponding to the cell 130c) for inter Radio Access Technology (inter-RAT). Besides, the D2D communication information is related to whether the plurality of neighbor cells (such as the cell 110c) or the plurality of frequencies (such as the frequency corresponding to the cells 120c and 130c) of the network node ND support D2D communication. For example, Table 1 lists the possible contents of the system information, which comprises Absolute Radio Frequency Channel Numbers (ARFCNs) and the information about whether D2D communication is supported (i.e., the D2D communication information). An Absolute Radio Frequency Channel Number (ARFCN) corresponds to a specific UL frequency and a specific DL frequency. Corresponding to the ARFCN of the serving cell 100c, the system information further provides Cell ID. For example, the Cell ID of the neighbor cell 110c corresponding to the same frequency as that of the serving cell 100c could be any integer of 1 to 4.

TABLE 1

|  | ARFCN | Cell ID | the first CellReselectionPriority parameter | whether D2D communication is supported |
|---|---|---|---|---|
| inter frequency | 1650 |  | 6 | x |
| the serving cell | 1600 | 1 | 5 | v |
| intra frequency | 1600 | 2 | 5 | v |
| intra frequency | 1600 | 3 | 5 | v |
| intra frequency | 1600 | 4 | 5 | x |
| inter frequency | 1700 |  | 4 | v |
| inter-RAT (UMTS) | 10700 |  | 3 | x |

In other words, since the communication device UE1 can receive the D2D communication information broadcasted by the network node ND, the communication device UE1 can learn whether the plurality of neighbor cells or the plurality of frequencies of the network node ND support D2D communication.

Then, according to Step 304, when the communication device UE1 is in the operation scenario, the communication device UE1 would rearrange the received first priority information into the second priority information according to the D2D communication information. The operation scenario means that the communication device UE1 in idle mode is performing D2D communication, that the communication device UE1 in idle mode attempts to do D2D communication, or that the communication device UE1 leaves connected mode after the communication device UE1 attempting to do D2D communication transmits a ProSe interest indication to the network node ND but no response is fed back from the network node ND. The second priority information also comprises a plurality of second CellReselectionPriority parameters, and the maximum value means the highest priority. In the second priority information, the supporting neighbor cells or the supporting frequencies is better ranked than the non-supporting neighbor cells or the non-supporting frequencies—namely, the second CellReselectionPriority parameters of the supporting neighbor cells or the supporting frequencies are greater. For example, please refer to Table 1 and Table 2 together. Specifically, Table 1 lists the relation between the first CellReselectionPriority parameters and ARFCNs before the rearrangement in Step 304 is performed, while Table 2 lists the relation between the second CellReselectionPriority parameters and ARFCNs after the rearrangement in Step 304 is performed. As shown in Table 1, before the rearrangement in Step 304 is performed, the first CellReselectionPriority parameters are integers of different values according to different ARFCNs, respectively. And in Table 2, after the rearrangement in Step 304 is performed, the second CellReselectionPriority parameters are integers of different values according to different ARFCNs and also according to whether D2D communication is supported. Consequently, the values and the order of the second CellReselectionPriority parameters are quite different from those of the first CellReselectionPriority parameters. For example, although the frequency corresponding to ARFCN of 1650 is better ranked with the first CellReselectionPriority parameter equal to 6 in Table 1, the second CellReselectionPriority parameter becomes 3 in Table 2—meaning that the priority is lower—since the frequency corresponding to ARFCN of 1650 fails to support D2D communication. Besides, despite the fact that the cells with the Cell ID of 1 to 4 have the same ARFCN (which is 1600), the second CellReselectionPriority parameters vary because some of them do not support D2D communication as the other. That is to say, even if the frequency of the neighbor cell 110c is the same as that of the serving cell 100c, their priorities for a cell reselection procedure may differ (based on whether D2D communication is supported).

TABLE 2

|  | ARFCN | Cell ID | the second CellReselectionPriority parameter | whether D2D communication is supported |
|---|---|---|---|---|
| the serving cell | 1600 | 1 | 5 | v |
| intra frequency | 1600 | 2 | 5 | v |
| intra frequency | 1600 | 3 | 5 | v |
| inter frequency | 1700 |  | 4 | v |
| inter frequency | 1650 |  | 3 | x |
| intra frequency | 1600 | 4 | 2 | x |
| inter-RAT (UMTS) | 10700 |  | 1 | x |

In other words, because the communication device UE1 would perform ranking and provide the second priority information according to the D2D communication information, which makes the supporting neighbor cells or the supporting frequencies have priority over the non-supporting neighbor cells or the non-supporting frequencies, the communication device UE1 can perform a cell reselection procedure according to whether the plurality of neighbor cells or the plurality of frequencies of the network node ND support D2D communication.

In Step 306, a cell is selected as the at least one candidate frequency cell corresponding to frequencies (such as the cell 120c or 130c) or the at least one candidate neighbor cell (such as the cell 110c) from the plurality of neighbor cells or the plurality of frequencies when its second CellReselectionPriority parameter is equal to or greater than that of the serving cell 100c according to the second priority information. Then, further arrangement relation between the serving cell 100c and the at least one candidate frequency cell or the at least one candidate neighbor cell (i.e., Step 308 or Step 314) is to be determined. According to Table 2, the cells with the Cell ID of 2 and 3 are selected in Step 306.

In Step 308, when the at least one candidate neighbor cell (such as the cells with the Cell ID of 2 and 3 in Table 2) or the at least one candidate frequency cell is determined to have the same priority as the serving cell 100c according to the second priority information, a first cell reselection criterion is executed. The first cell reselection criterion is basically similar to the illustration specified in 3GPP standard TS 36.304 section 5.2.4.6, and comprises Steps 310 and 312. In Step 310, the R criterion prioritization is performed in order to identify the best cell according to the first calculation result (i.e., cell-ranking criterion Rs) for the serving cell 100c and the at least one second calculation result (i.e., cell-ranking criterion Rn) for the at least one candidate frequency cell or the at least one candidate neighbor cell. In Step 312, the communication device UE1 selects one cell with the highest priority from the at least one candidate frequency cell or the at least one candidate neighbor cell according to the R criterion prioritization. Subsequently, the communication device UE1 may perform cell reselection to the chosen cell. During the R criterion prioritization, the serving cell 100c and the at least one candidate frequency cell or the at least one candidate neighbor cell are ranked according to the cell-ranking criterion Rs and the cell-ranking criterion Rn, which means that offset is applied to measurement quantities of the at least one candidate frequency cell or the at least one candidate neighbor cell before the measurement quantities of the at least one candidate frequency cell or the at least one candidate neighbor cell is compared to that of the serving cell 100c.

In Step 314, when the priority of the at least one candidate frequency cell or the at least one candidate neighbor cell is determined to be different from that of the serving cell 100c according to the second priority information, a second cell reselection criterion is executed. The second cell reselection criterion is basically similar to the illustration specified in 3GPP standard TS 36.304 section 5.2.4.5, and comprises Steps 316 and 318. In Step 316, when the priority of the at least one candidate frequency cell or the at least one candidate neighbor cell is higher than that of the serving cell 100c, and when the at least one first measurement result of the at least one candidate frequency cell or the at least one candidate neighbor cell is greater than the first threshold value during the time interval $Treselection_{RAT}$, the communication device UE1 selects one cell with the highest priority from the at least one candidate frequency cell or the at least one candidate neighbor cell. Alternatively, when the number of the at least one candidate frequency cell or the at least one candidate neighbor cell meeting the above criteria (i.e., having priority over the serving cell 100c and having the at least one first measurement result greater than the first threshold value) is in fact more than one, the communication device UE1 selectively depends on the at least one second calculation result (i.e., cell-ranking criterion Rn) according to communication system type (such as UMTS and LTE) to select one cell with the highest priority. Subsequently, the communication device UE1 may perform cell reselection to the chosen cell. In Step 318, when the priority of the at least one candidate frequency cell or the at least one candidate neighbor cell is lower than that of the serving cell 100c, and when the second measurement result of the serving cell 100c is less than the second threshold value during the time interval $Treselection_{RAT}$, and when the at least one first measurement result of the at least one candidate frequency cell or the at least one candidate neighbor cell is greater than the third threshold value during the time interval $Treselection_{RAT}$, the communication device UE1 selects one cell with the highest priority from the at least one candidate frequency cell or the at least one candidate neighbor cell. Alternatively, when the number of the at least one candidate frequency cell or the at least one candidate neighbor cell meeting the above criteria is in fact more than one, the communication device UE1 selectively depends on the cell-ranking criterion Rn according to the communication system type to select one cell with the highest priority. Subsequently, the communication device UE1 may perform cell reselection to the chosen cell. According to the communication system type (such as UMTS and LTE), the at least one first measurement result and the second measurement result may be a cell selection quality value (referred to as Squal) in a form of received signal quality indication or a cell selection received level value (referred to as Srxlev) in a form of received signal strengthen indication; the first threshold value may be $Thresh_{X, HighQ}$ value or $Thresh_{X, HighP}$ value; the second threshold value may be $Thresh_{Serving, LowQ}$ value; the third threshold value may be $Thresh_{X, LowQ}$ value or $Thresh_{X, LowP}$ value. In addition, when there is merely one (instead of at least one) candidate frequency cell or merely one (instead of at least one) candidate neighbor cell, or when there is merely one of the at least one candidate frequency cell or the at least one candidate neighbor cell with the first measurement result greater than the first threshold value or the third threshold value during the time interval $Treselection_{RAT}$, the communication device UE1 directly chooses this cell to perform cell reselection without using the cell-ranking criterion Rn for ranking.

In other words, after the communication device UE1 generates the second priority information according to the D2D communication information, even if the frequency of the neighbor cells is the same as that of the serving cell 100c, their priorities in the second priority information may differ. In such a situation, to perform the first cell reselection criterion in Step 308 or the second cell reselection criterion in Step 314, it is whether the at least one candidate frequency cell or the at least one candidate neighbor cell has the same priority as the serving cell 100 (instead of whether it is inter frequency or intra frequency) that is concerned.

Figure 5:
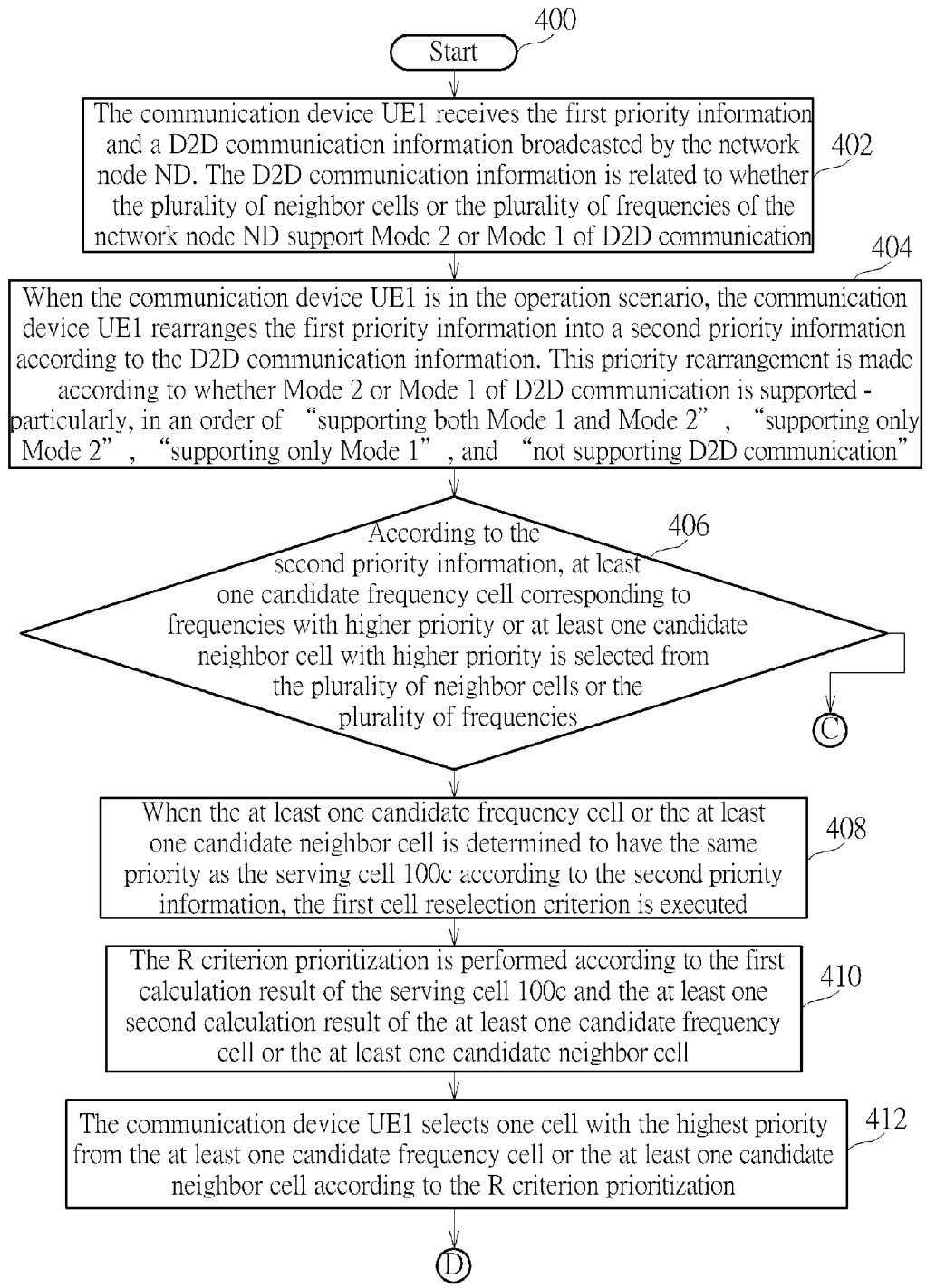
FIG. 5 and FIG. 6 are flowcharts illustrating a process according to an embodiment of the present invention.
Figure 6:
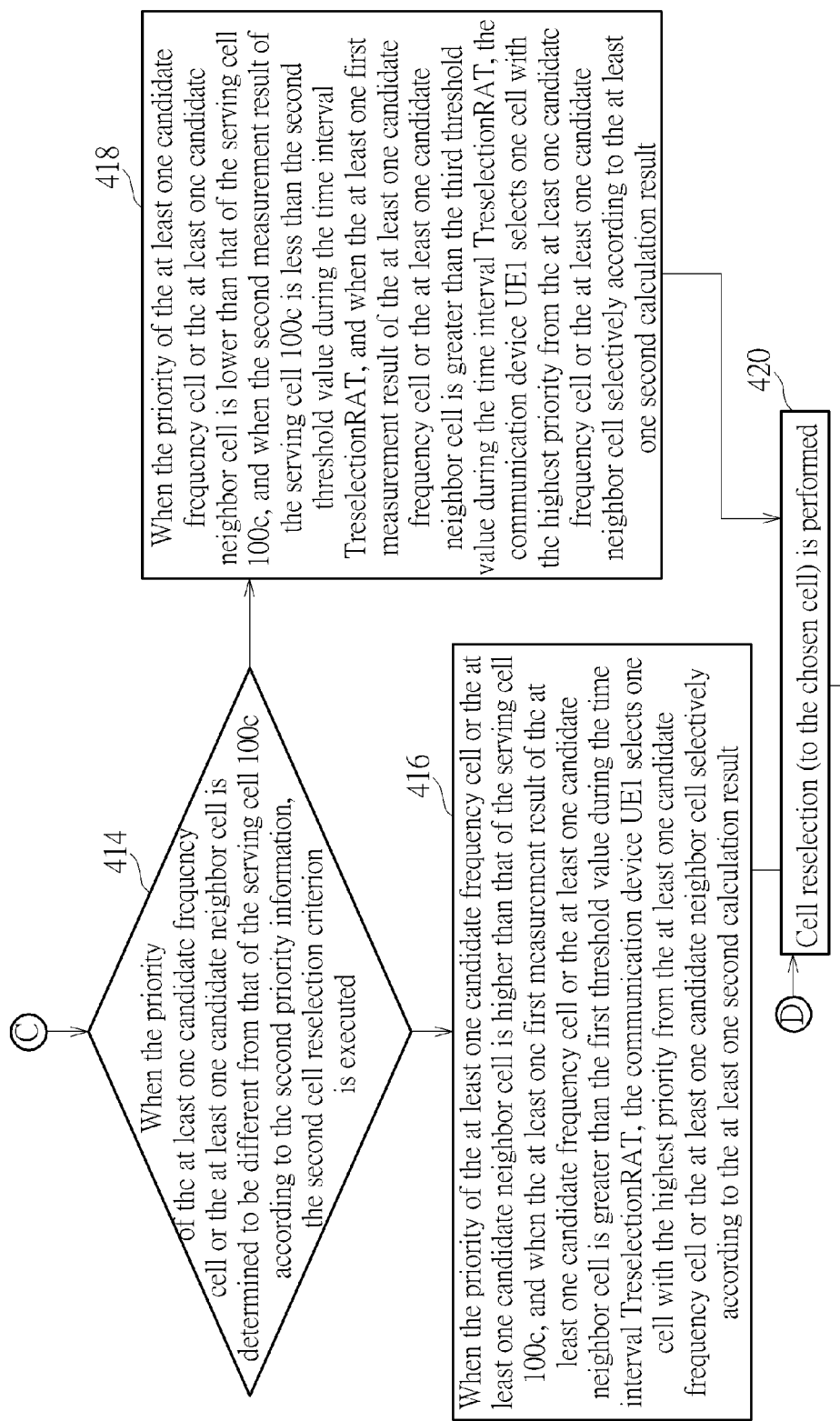

Please note that the communication system 10 in FIG. 1, the device 20 in FIG. 2 and the process 30 in FIG. 3 and FIG. 4 are exemplary embodiments of the invention, and those skilled in the art can make alternations and modifications accordingly. For example, to further enhance cell reselection efficiency, please refer to FIG. 5 and FIG. 6. FIG. 5 and FIG. 6 are flowcharts illustrating a process 40 according to an embodiment of the present invention. The process 40 can be utilized in the communication device UE1 shown in FIG. 1 to perform cell reselection. The process 40 may be compiled into the program code 214 and includes the following Steps:

Step 400: Start.

Step 402: The communication device UE1 receives the first priority information and a D2D communication information broadcasted by the network node ND. The D2D communication information is related to whether the plurality of neighbor cells or the plurality of frequencies of the network node ND support Mode 2 or Mode 1 of D2D communication.

Step 404: When the communication device UE1 is in the operation scenario, the communication device UE1 rearranges the first priority information into a second priority information according to the D2D communication information. This priority rearrangement is made according to whether Mode 2 or Mode 1 of D2D communication is supported—particularly, in an order of "supporting both Mode 1 and Mode 2", "supporting only Mode 2", "supporting only Mode 1", and "not supporting D2D communication".

Step 406: According to the second priority information, at least one candidate frequency cell corresponding to frequencies with higher priority or at least one candidate neighbor cell with higher priority is selected from the plurality of neighbor cells or the plurality of frequencies.

Step 408: When the at least one candidate frequency cell or the at least one candidate neighbor cell is determined to have the same priority as the serving cell 100c according to the second priority information, the first cell reselection criterion is executed.

Step 410: The R criterion prioritization is performed according to the first calculation result of the serving cell 100c and the at least one second calculation result of the at least one candidate frequency cell or the at least one candidate neighbor cell.

Step 412: The communication device UE1 selects one cell with the highest priority from the at least one candidate frequency cell or the at least one candidate neighbor cell according to the R criterion prioritization. After that, go to Step 420.

Step 414: When the priority of the at least one candidate frequency cell or the at least one candidate neighbor cell is determined to be different from that of the serving cell 100c according to the second priority information, the second cell reselection criterion is executed.

Step 416: When the priority of the at least one candidate frequency cell or the at least one candidate neighbor cell is higher than that of the serving cell 100c, and when the at least one first measurement result of the at least one candidate frequency cell or the at least one candidate neighbor cell is greater than the first threshold value during the time interval $Treselection_{RAT}$, the communication device UE1 selects one cell with the highest priority from the at least one candidate frequency cell or the at least one candidate neighbor cell selectively according to the at least one second calculation result. After that, go to Step 420.

Step 418: When the priority of the at least one candidate frequency cell or the at least one candidate neighbor cell is lower than that of the serving cell 100c, and when the second measurement result of the serving cell 100c is less than the second threshold value during the time interval $Treselection_{RAT}$, and when the at least one first measurement result of the at least one candidate frequency cell or the at least one candidate neighbor cell is greater than the third threshold value during the time interval $Treselection_{RAT}$, the communication device UE1 selects one cell with the highest priority from the at least one candidate frequency cell or the at least one candidate neighbor cell selectively according to the at least one second calculation result. After that, go to Step 420.

Step 420: Cell reselection (to the chosen cell) is performed.

Step 422: End.

As set forth above, the structure of the process 40 is similar to that of the process 30. However, unlike the process 30, the D2D communication information in Step 402, which is broadcasted by the serving cell 100c and received by the communication device UE1 camping on the serving cell 100c, is related to whether the plurality of neighbor cells (such as the cell 110c) or the plurality of frequencies (such as the frequency corresponding to the cells 120c and 130c) of the network node ND support Mode 2 or Mode 1 of D2D communication. As a result, the communication device UE1 can learn whether and how the plurality of neighbor cells or the plurality of frequencies of the network node ND support D2D communication.

Moreover, according to Step 404, when the communication device UE1 is in the operation scenario, the communication device UE1 rearranges the received first priority information into the second priority information according to the D2D communication information. Technically, the communication device in idle mode mainly supports Mode 2. Therefore, in an embodiment, the neighbor cells or the frequencies which support Mode 1 and Mode 2 of D2D communication (hereinafter referred to as the mode1-mode2-supporting neighbor cells and the mode1-mode2-supporting frequencies respectively) or the neighbor cells or the frequencies which support merely Mode 2 of D2D communication (hereinafter referred to as the mode2-supporting neighbor cells and the mode2-supporting frequencies respectively) have higher priority than the neighbor cells or the frequencies which support merely Mode 1 of D2D communication (hereinafter referred to as the mode1-supporting neighbor cells and the mode1-supporting frequencies respectively); the mode1-supporting neighbor cells and the mode1-supporting frequencies have higher priority than the neighbor cells or the frequencies which do not support D2D communication (hereinafter referred to as the non-supporting neighbor cells and the non-supporting frequencies respectively). For example, please refer to Table 3 and Table 4. Table 3 lists the relation between the first CellReselectionPriority parameters and ARFCNs before the rearrangement in Step 404 is performed, while Table 4 lists the relation between the second CellReselectionPriority parameters and ARFCNs after the rearrangement in Step 404 is performed. As shown in Table 3 and Table 4, the first priority information is rearranged into the second priority information according to ARFCNs and whether Mode 2 or Mode 1 of D2D communication is supported. For example, although the frequency corresponding to ARFCN of 1650 is better ranked with the first CellReselectionPriority parameter equal to 6 in Table 3, the second CellReselectionPriority parameter becomes 2 in Table 4—meaning that the priority is lower—since the frequency corresponding to ARFCN of 1650 fails to support D2D communication. Moreover, in Step 406, a cell is selected as the at least one candidate frequency cell (corresponding to frequencies) or the at least one candidate neighbor cell from the plurality of neighbor cells or the plurality of frequencies when its second CellReselectionPriority parameter is equal to or greater than that of the serving cell 100c according to the second priority information. Accordingly, in Table 4, merely the cell with the Cell ID of 2, which has the greater second CellReselectionPriority parameter equal to 5, would be selected (as the at least one candidate neighbor cell) in Step 406 to perform. Step 408 to Step 412.

TABLE 3

|  | ARFCN | Cell ID | the first CellReselec- tionPriority parameter | whether Mode 1 of D2D communi- cation is supported | whether Mode 2 of D2D communi- cation is supported |
|---|---|---|---|---|---|
| inter frequency | 1650 |  | 6 | x | x |
| the serving cell | 1600 | 1 | 5 | x | v |
| intra frequency | 1600 | 2 | 5 | v | v |
| intra frequency | 1600 | 3 | 5 | v | x |
| intra frequency | 1600 | 4 | 5 | x | x |
| inter frequency | 1700 |  | 4 | v | v |
| inter-RAT (UMTS) | 10700 |  | 3 | x | x |

TABLE 4

|  | ARFCN | Cell ID | the second CellReselec- tionPriority parameter | whether Mode 1 of D2D communi- cation is supported | whether Mode 2 of D2D communi- cation is supported |
|---|---|---|---|---|---|
| the serving cell | 1600 | 1 | 5 | x | v |
| intra frequency | 1600 | 2 | 5 | v | v |
| inter frequency | 1700 |  | 4 | v | v |
| intra frequency | 1600 | 3 | 3 | v | x |
| inter frequency | 1650 |  | 2 | x | x |
| intra frequency | 1600 | 4 | 1 | x | x |
| inter-RAT (UMTS) | 10700 |  | 0 | x | x |

However, the present invention is not limited to this. In another embodiment, the mode1-mode2-supporting neighbor cells and the mode1-mode2-supporting frequencies have higher priority than the mode2-supporting neighbor cells and the mode2-supporting frequencies; the mode2-supporting neighbor cells and the mode2-supporting frequencies have higher priority than the mode1-supporting neighbor cells and the mode1-supporting frequencies; the mode1-supporting neighbor cells and the mode1-supporting frequencies have higher priority than the non-supporting neighbor cells and the non-supporting frequencies. For example, please refer to Table 3 and Table 5. Table 3 lists the relation between the first CellReselectionPriority parameters and ARFCNs before the rearrangement in Step 404 is performed, while Table 5 lists the relation between the second CellReselectionPriority parameters and ARFCNs after the rearrangement in Step 404 is performed. As shown in Table 3 and Table 5, the first priority information is rearranged into the second priority information according to ARFCNs and whether Mode 2 or Mode 1 of D2D communication is supported. For example, although the frequency corresponding to ARFCN of 1650 is better ranked with the first CellReselectionPriority parameter equal to 6 in Table 3, the second CellReselectionPriority parameter becomes 3 in Table 5 since the frequency corresponding to ARFCN of 1650 fails to support D2D communication. Moreover, in Step 406, merely the cell with the Cell ID of 2, which has the greater second CellReselectionPriority parameter equal to 7, would be selected (as the at least one candidate neighbor cell) in Step 406 to perform Step 414 and Step 416.

TABLE 5

|  | ARFCN | Cell ID | the second CellReselec- tionPriority parameter | whether Mode 1 of D2D communi- cation is supported | whether Mode 2 of D2D communi- cation is supported |
|---|---|---|---|---|---|
| intra frequency | 1600 | 2 | 7 | v | v |
| inter frequency | 1700 |  | 6 | v | v |
| the serving cell | 1600 | 1 | 5 | x | v |
| intra frequency | 1600 | 3 | 4 | v | x |
| inter frequency | 1650 |  | 3 | x | x |
| intra frequency | 1600 | 4 | 2 | x | x |
| inter-RAT (UMTS) | 10700 |  | 1 | x | x |

In other words, because the communication device UE1 would perform ranking and provide the second priority information according to whether Mode 2 or Mode 1 of D2D communication is supported, the communication device UE1 can reselect a new cell according to whether the plurality of neighbor cells or the plurality of frequencies support D2D communication when performing cell reselection.

It is worth noting that results shown in Tables 2, 4 and 5 are exemplary approaches to rearranging the first priority information into the second priority information, and may be properly adjusted according to different system requirements and design considerations. For example, in Table 1 to Table 5, the first CellReselectionPriority parameter of the serving cell 100c has the same value (i.e., 5) as the second CellReselectionPriority parameter of the serving cell 100c. Alternatively, the maximum in the second CellReselectionPriority parameters can be first set to 5, and the second CellReselectionPriority parameters of the serving cell 100c and the remainder of the plurality of neighbor cells or the plurality of frequencies are then determined according to their priorities. Alternatively, the second CellReselectionPriority parameters of the non-supporting neighbor cells and the non-supporting frequencies are assigned to be zero.

As set forth above, the present invention aims to provide a method of cell reselection for the communication device UE1. The communication device UE1 receives the first priority information and the D2D communication information broadcasted by the network node ND. When the communication device UE1 is in the operation scenario, the communication device UE1 rearranges the first priority information into the second priority information according to the D2D communication information. Similarly, the method of cell reselection provided in the present invention can be correspondingly employed in the network node ND. Specifically, the network node ND broadcasts the D2D communication information and the first priority information. When the communication device UE1 is in the operation scenario, the communication device UE1 rearranges the first priority information into the second priority information according to the D2D communication information. Besides, how the first priority information is rearranged into the second priority information depends on the D2D communication information. When the D2D communication information is related to whether the plurality of neighbor cells or the plurality of frequencies of the network node ND support D2D communication (Step 302), the supporting neighbor cells and the supporting frequencies have higher priority in the second priority information than the non-supporting neighbor cells and the non-supporting frequencies (Step 304). When the D2D communication information is related to whether the plurality of neighbor cells or the plurality of frequencies of the network node ND support Mode 2 or Mode 1 of D2D communication (Step 402), the priority rearrangement in the second priority information is in an order of "supporting both Mode 1 and Mode 2", "supporting only Mode 2", "supporting only Mode 1", and "not supporting D2D communication" (Step 404).

In the prior art, the communication device has no idea whether the network node supports D2D communication and whether Mode 2 or Mode 1 of D2D communication is supported. Furthermore, the magnitudes of the first CellReselectionPriority parameters defined in TS 36.331 is irrelevant to whether the network node supports D2D communication or not; therefore, the neighbor cells with highest priority or the frequencies with highest priority on the basis of the first CellReselectionPriority parameter may not support D2D communication.

By comparison, the network node ND of the present invention would broadcast whether D2D communication is supported and even whether Mode 2 or Mode 1 of D2D communication is supported. In this way, the communication device UE1 knows whether D2D communication is supported, and hence rearranges the first priority information comprising the first CellReselectionPriority parameters into the second priority information to highly rank the neighbor cells or the frequencies which support D2D communication (i.e., the supporting neighbor cells or the supporting frequencies). Subsequently, the communication device UE1 may execute the first cell reselection criterion or the second cell reselection criterion to choose the best-ranked cell for cell reselection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cell reselection method, adapted to a communication device of a communication system, comprising:
    receiving a first priority information and a Device to Device (D2D) communication information broadcasted by a network node of the communication system, wherein the D2D communication information is related to whether a plurality of neighbor cells or a plurality of frequencies of the network node support D2D communication; and
    rearranging the first priority information into a second priority information according to the D2D communication information when the communication device is in an operation scenario, comprising:
        ranking the neighbor cells or the frequencies supporting D2D communication of the plurality of neighbor cells or the plurality of frequencies higher than the neighbor cells or the frequencies not supporting D2D communication of the plurality of neighbor cells or the plurality of frequencies;
    wherein the D2D communication information is related to whether the plurality of neighbor cells or the plurality of frequencies of the network node support Mode 1 or Mode 2 of D2D communication, the Mode 1 represents resource allocation for the communication device by the network node and the Mode 2 represents resource selected by the communication device.

2. The cell reselection method of claim 1, wherein the step of rearranging the first priority information into the second priority information according to the D2D communication information comprises:
    ranking neighbor cells or frequencies supporting Mode 1 and Mode 2 of D2D communication of the plurality of neighbor cells or the plurality of frequencies higher than the neighbor cells or the frequencies supporting merely Mode 1 of D2D communication of the plurality of neighbor cells or the plurality of frequencies;
    ranking the neighbor cells or the frequencies supporting merely Mode 2 of D2D communication of the plurality of neighbor cells or the plurality of frequencies higher than the neighbor cells or the frequencies supporting merely Mode 1 of D2D communication of the plurality of neighbor cells or the plurality of frequencies; and
    ranking the neighbor cells or the frequencies supporting merely Mode 1 of D2D communication of the plurality of neighbor cells or the plurality of frequencies higher than the neighbor cells or the frequencies not supporting D2D communication of the plurality of neighbor cells or the plurality of frequencies.

3. The cell reselection method of claim 2, wherein the step of rearranging the first priority information into the second priority information according to the D2D communication information further comprises:
    ranking the neighbor cells or the frequencies supporting Mode 1 and Mode 2 of D2D communication of the plurality of neighbor cells or the plurality of frequencies higher than the neighbor cells or the frequencies supporting merely Mode 2 of D2D communication of the plurality of neighbor cells or the plurality of frequencies.

4. The cell reselection method of claim 1, wherein the operation scenario occurs when the communication device in idle mode is performing D2D communication, when the communication device in idle mode attempts to do D2D communication, or when the communication device leaves connected mode because the communication device transmits a ProSe interest indication to the network node but no response is fed back from the network node.

5. The cell reselection method of claim 1, further comprising:
    selecting at least one candidate with highest priority from the plurality of neighbor cells or the plurality of frequencies according to the second priority information;
    executing a first cell reselection criterion when the at least one candidate is determined to have priority the same as a serving cell according to the second priority information, wherein the first cell reselection criterion comprises:
        performing an R criterion prioritization according to a first calculation result of the serving cell and at least one second calculation result of the at least one candidate; and
        performing cell reselection to a candidate with highest priority of the at least one candidate according to the R criterion prioritization;
    executing a second cell reselection criterion when the at least one candidate is determined to have priority different from the serving cell according to the second priority information, wherein the second cell reselection criterion comprises:
        performing cell reselection to one of the at least one candidate selectively according to the at least one second calculation result when priority of the at least one candidate is higher than priority of the serving cell, and when at least one first measurement result of the at least one candidate is greater than a first threshold value during a time interval; and performing cell reselection to one of the at least one candidate selectively according to the at least one second calculation result when the priority of the at least one candidate is lower than priority of the serving cell, when a second measurement result of the serving cell is less than a second threshold value during the time interval, and when the at least one first measurement result of the at least one candidate is greater than a third threshold value during the time interval;

wherein the communication device camps on the serving cell.

6. The cell reselection method of claim 5, wherein the time interval is $\text{Treselection}_{RAT}$ specified in 3rd Generation Partnership Project (3GPP) standard, the first measurement result and the second measurement result are a cell selection quality value Squal or a cell selection received level value Srxlev specified in the 3GPP standard, the first threshold value is $\text{Thresh}_{X,\ HighQ}$ value or $\text{Thresh}_{X,\ HighP}$ value specified in the 3GPP standard, the second threshold value is $\text{Thresh}_{Serving,\ LowQ}$ value specified in the 3GPP standard, the third threshold value is $\text{Thresh}_{X,\ LowQ}$ value or $\text{Thresh}_{X,\ LowP}$ value specified in the 3GPP standard, the first calculation result is cell-ranking criterion Rs value specified in the 3GPP standard, and the second calculation result is cell-ranking criterion Rn value specified in the 3GPP standard.

7. A cell reselection method, adapted to a network node of a communication system, comprising:

broadcasting a first priority information and a Device to Device (D2D) communication information, wherein the D2D communication information is related to whether a plurality of neighbor cells or a plurality of frequencies of the network node support D2D communication;

wherein a communication device of the communication system rearranges the first priority information into a second priority information according to the D2D communication information when the communication device is in an operation scenario, comprising:

ranking neighbor cells or frequencies supporting D2D communication of the plurality of neighbor cells or the plurality of frequencies higher than the neighbor cells or the frequencies not supporting D2D communication of the plurality of neighbor cells or the plurality of frequencies;

wherein the D2D communication information is related to whether the plurality of neighbor cells or the plurality of frequencies of the network node support Mode 1 or Mode 2 of D2D communication, the Mode 1 represents resource allocation for the communication device by the network node and the Mode 2 represents resource selected by the communication device.

8. The cell reselection method of claim 7, the step of rearranging the first priority information into the second priority information according to the D2D communication information comprises:

ranking neighbor cells or frequencies supporting Mode 1 and Mode 2 of D2D communication of the plurality of neighbor cells or the plurality of frequencies higher than the neighbor cells or the frequencies supporting merely Mode 1 of D2D communication of the plurality of neighbor cells or the plurality of frequencies;

ranking neighbor cells or frequencies supporting merely Mode 2 of D2D communication of the plurality of neighbor cells or the plurality of frequencies higher than the neighbor cells or the frequencies supporting merely Mode 1 of D2D communication of the plurality of neighbor cells or the plurality of frequencies; and ranking the neighbor cells or the frequencies supporting merely Mode 1 of D2D communication of the plurality of neighbor cells or the plurality of frequencies higher than the neighbor cells or the frequencies not supporting D2D communication of the plurality of neighbor cells or the plurality of frequencies.

9. The cell reselection method of claim 8, wherein the step of rearranging the first priority information into the second priority information according to the D2D communication information further comprises:

ranking the neighbor cells or the frequencies supporting Mode 1 and Mode 2 of D2D communication of the plurality of neighbor cells or the plurality of frequencies higher than the neighbor cells or the frequencies supporting merely Mode 2 of D2D communication of the plurality of neighbor cells or the plurality of frequencies.

10. The cell reselection method of claim 7, wherein the operation scenario occurs when the communication device in idle mode is performing D2D communication, when the communication device in idle mode attempts to do D2D communication, or when the communication device leaves connected mode because the communication device transmits a ProSe interest indication to the network node but no response is fed back from the network node.

11. The cell reselection method of claim 7, further comprises:

selecting at least one candidate with highest priority from the plurality of neighbor cells or the plurality of frequencies according to the second priority information;

executing a first cell reselection criterion when the at least one candidate is determined to have priority the same as a serving cell according to the second priority information, wherein the first cell reselection criterion comprises:

performing an R criterion prioritization according to a first calculation result of the serving cell and at least one second calculation result of the at least one candidate; and performing cell reselection to a candidate with highest priority of the at least one candidate according to the R criterion prioritization, executing a second cell reselection criterion when the at least one candidate is determined to have priority different from the serving cell according to the second priority information, wherein the second cell reselection criterion comprises:

performing cell reselection to one of the at least one candidate selectively according to the at least one second calculation result when priority of the at least one candidate is higher than priority of the serving cell, and when at least one first measurement result of the at least one candidate is greater than a first threshold value during a time interval; and performing cell reselection to one of the at least one candidate selectively according to the at least one second calculation result when the priority of the at least one candidate is lower than priority of the serving cell, when a second measurement result of the serving cell is less than a second threshold value during the time interval, and when the at least one first measurement result of the at least one candidate is greater than a third threshold value during the time interval;

wherein the communication device camps on the serving cell.

12. The cell reselection method of claim 11, wherein the time interval is $Treselection_{RAT}$ specified in 3rd Generation Partnership Project (3GPP) standard, the first measurement result and the second measurement result are a cell selection quality value Squal or a cell selection received level value Srxlev specified in the 3GPP standard, the first threshold value is $Thresh_{X, HighQ}$ value or $Thresh_{X, HighP}$ value specified in the 3GPP standard, the second threshold value is $Thresh_{Serving, LowQ}$ value specified in the 3GPP standard, the third threshold value is $Thresh_{X, LowQ}$ value or $Thresh_{X, LowP}$ value specified in the 3GPP standard, the first calculation result is cell-ranking criterion Rs value specified in the 3GPP standard, and the second calculation result is cell-ranking criterion Rn value specified in the 3GPP standard.

* * * * *